Sept. 13, 1932.  T. P. GARDNER  1,877,292
COMBINATION INFLOW CONTROLLING AND FLUID DISCHARGE MEANS
Filed Oct. 20, 1931  2 Sheets-Sheet 1

INVENTOR
Thomas P. Gardner
BY his ATTORNEY
R. J. Dearborn

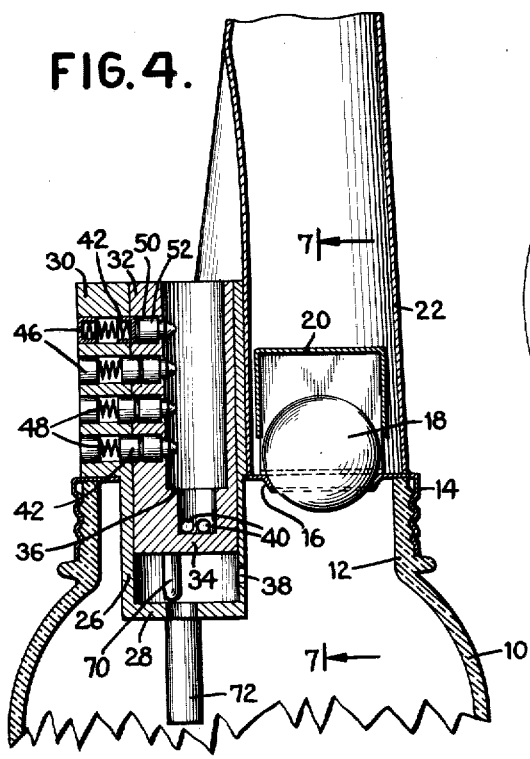

Patented Sept. 13, 1932

1,877,292

UNITED STATES PATENT OFFICE

THOMAS P. GARDNER, OF PORT ARTHUR, TEXAS, ASSIGNOR TO THE TEXAS COMPANY, OF NEW YORK, N. Y., A CORPORATION OF DELAWARE

COMBINATION INFLOW-CONTROLLING AND FLUID-DISCHARGE MEANS

Application filed October 20, 1931. Serial No. 569,897.

This invention relates to filling and dispensing equipment and more particularly to an improved form of container or bottle which can be filled or refilled only by one authorized to do so, and to the cooperating filling mechanism.

One of the problems common to venders of lubricating oils is that of substitution which frequently takes the form of refilling empty containers bearing the trade-mark or name of a reputable manufacturer or marketer with an inferior product, which is then sold to unwary and unsuspecting purchasers at the price of the better oil which the purchasers suppose they are receiving. Realizing the importance of this problem both to the vender and to the purchaser, I have developed apparatus which has for its object, broadly speaking, to prevent the unauthorized substitution of oil by unscrupulous dealers and to prevent the unlicensed use of containers such as oil dispensing bottles which are equipped with my improved device.

It is a further object of my invention to provide a container which can be readily and quickly filled by a dealer equipped with the necessary cooperating oil dispensing apparatus.

A still further object of my invention is to provide an oil dispensing container or bottle having means for closing and locking the filling opening, and cooperating means in the nature of a combined spout and key associated with an oil dispensing pump for unlocking and making a filling connection between the pump and the container.

Another object of my invention is to provide a novel form of spout, including as an element a closure device for the filling opening of a container or bottle, the closure device being automatically maintained in closed position to prevent unauthorized filling of the container.

Still another object of my invention is to provide a novel form of spout for an oil dispensing pump, the spout being in the form of a key which is adapted to be inserted in the spout of an oil dispensing bottle provided with a closure device for the filling opening, to unlock and open the normally closed closure device of the spout.

A further object of the invention is to provide means in the dispensing spout of a container for preventing the filling of the container through the dispensing outlet.

Other objects, features and advantages of the invention will appear as the description thereof, taken in connection with the accompanying drawings, proceeds.

In the drawings—

Figure 4 is a view in vertical section taken on the line 4—4 of Figure 2;

Figure 5 is also a view in vertical section taken on line 4—4 of Figure 2 and showing the key-like dispensing spout in operative position;

Figure 6 is a sectional plan view taken on line 6—6 of Figure 5;

Figure 7 is a view in vertical section taken on line 7—7 of Figure 4;

Figure 8 is an enlarged view of a portion of the locking cam shown in dotted lines in Figure 2.

Figure 1:
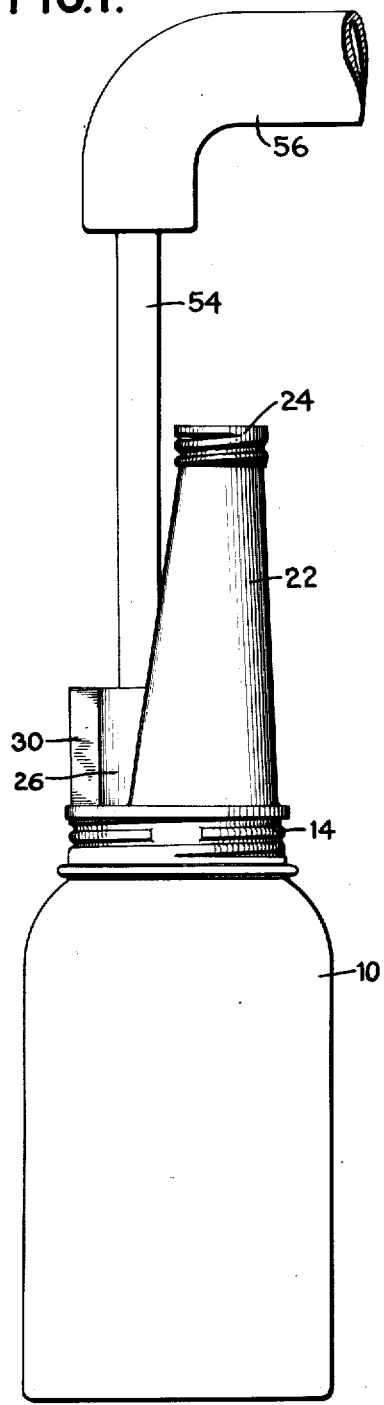
Figure 1 is a general assembly view showing a lubricating oil bottle embodying my invention in position to be filled from an oil dispensing pump.
Figure 2:
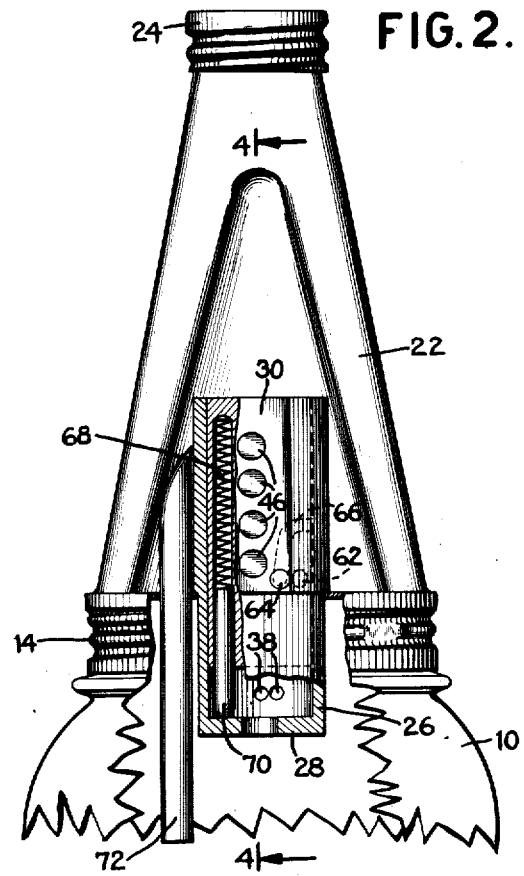
Figure 2 is an enlarged view, partially in section, of the spout of the bottle shown in Figure 1.
Figure 3:
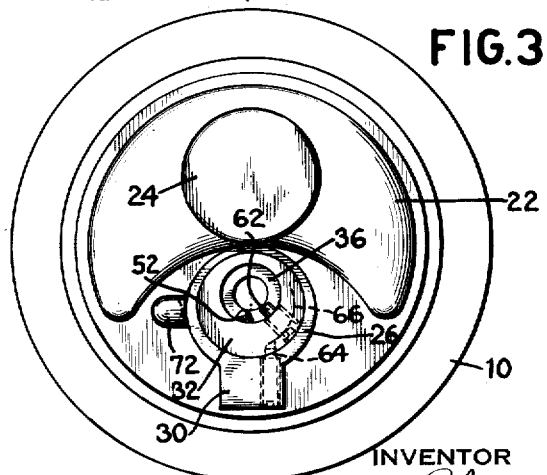
Figure 3 is a top plan view of the bottle and spout shown in Figure 2.

The invention is applicable to a wide variety of receptacles or containers but for illustrative purposes it is shown in the drawings as applied to a container in the form of a glass bottle 10 formed with a threaded neck 12 to which a cylindrical and threaded cap-like member 14 may be screwed to close the top of the bottle. If desired, the threads on the neck of the bottle may be broken and the cap, after it is screwed into place, may be indented at the points where the thread is omitted in order to secure the cap firmly in position or any other suitable means may be employed to secure the cap in the desired position.

The top of cap 14 is formed with a circular discharge opening which is provided with a downwardly extending peripheral flange 16 that constitutes a seat for a ball check valve 18. A cage or gate 20 is provided for limiting the movement of ball 18 when the bottle is inverted and the ball drops away from its seat 16. The cage is so formed as to permit liquid to flow through it freely while at the same time eliminating the possibility of releasing the ball from its seat by outside means, such as a magnet or hook.

A pouring spout or funnel 22 is secured to the top of cap 14 and completely surrounds the discharge opening. At its base spout 22 is substantially crescent or kidney-shaped and is drawn or tapers off towards its opposite or outer end, which is cylindrical in cross-section. The small outer end of spout 22 is threaded to receive a closure member or cap 24.

Fitted into a second opening in cap 14 is a hollow cylindrical member 26, hereinafter to be referred to as the outer cylinder, which is substantially closed at its lower end as at 28, and formed at its other or upper end with an external projection or block 30, the lower end of the block being adapted to rest upon the top of cap 14.

A second hollow cylinder 32, hereinafter to be referred to as the inner cylinder, which is also closed at the lower end, as at 34, fits within outer cylinder 26 and is adapted to move longitudinally and rotatably therein. The bore of cylinder 32 is not of uniform size throughout its length but is of restricted diameter at the lower end, thereby forming an annular shoulder 36, the function of which will hereinafter be described.

A filling opening or openings 38 are formed in the wall of outer cylinder 26, preferably near its lower end, and similar openings 40 are formed in the wall of inner cylinder 32, near its lower end, the arrangement being such that the openings in the two cylinders are adapted to register when the two cylinders are in operative position with respect to one another and in other positions inner cylinder acts as a valve and effectively closes openings 38 in the outer cylinder.

Inner cylinder 32 is normally locked in a non-operative position, that is, with openings 40 out of registry with openings 38 of the cylinder by a series of tumblers 42, hereinafter to be referred to as the outer tumblers. These tumblers are slidably mounted in a series of horizontal bores 44 which extend through block 30, the bores being closed at their outer ends by means of retainer plugs 46. The tumblers are normally forced by springs 48 a short distance into corresponding bores 50 in the wall of inner cylinder 32, and when in this position they prevent the inner cylinder from moving in any direction.

Tumblers 42 must be pushed back against the pressure exerted by springs 48 in order to bring their inner ends into alignment and out of engagement with inner cylinder 32 before the latter can be moved into the filling position. This is accomplished by providing a second series of tumblers 52, hereinafter to be referred to as the inner tumblers, which are slidably mounted in bores 50 with tapered inner ends normally projecting through restricted openings at the inner ends of the bores into the main bore or opening of cylinder 32. It is apparent that if any pressure is applied to the projecting inner ends of inner tumblers 52, they will be forced outwardly and in so moving will produce a corresponding outward movement of outer tumblers 42. If, therefore, the movement of the tumblers is such as to push the outer ones out of engagement with the inner cylinder, the latter can be moved into operative position with openings 40 in registration with openings 38.

Proper alignment of outer tumblers 42 is effected by providing a key 54, which, in the present instance, preferably takes the form of a hollow tube, which is attached at one end to the discharge pipe 56 of an oil dispensing pump (not shown). The free end of tube 54 is exteriorly formed to provide a series or plurality of spaced annular key-like projections 58, so constructed and arranged that when the bottle is raised and the fixed tube 54 is inserted in the main bore of inner cylinder 32, projections 58 will engage the projecting ends of inner tumblers 52 and move them outwardly to in turn actuate outer tumblers 42 into operative alignment. As tumblers 42 are aligned, as shown in Figure 5, inner cylinder 32 is free to be moved, and by continuing to push the bottle upwardly, tube 54 forces inner cylinder 32 in a downwardly direction with respect to outer cylinder 26.

In order to bring ports 38 and 40 into registry, it is necessary to turn inner cylinder 32 through an angle of approximately 90 degrees, and to accomplish this result the lower end of tube 54 is provided with a longitudinal groove or slot 60, which is adapted to receive an end of a cylinder locking pin 62 secured in the wall of cylinder 32 and which projects into the main bore thereof. When pin 62 is engaged in slot 60 there can be no relative rotary movement between these members, inasmuch as tube 54 is secured in a fixed position to discharge pipe 56. If, therefore, the operator continues to turn bottle 10, outer cylinder 36 will rotate through the angle of 90 degrees around inner cylinder 32 until ports 38 and 40 are in registry.

In order to lock the elements in operative or discharge position, a lock screw or pin 64 is mounted in block 30, with one end thereof extending into a camway or slot 66, which is formed in the wall of inner cylinder 32. The slot extends substantially vertically for a portion of its length and at the upper extremity of the vertical portion continues in a horizontal plane. Thus, as cylinder 32 is moved downwardly with respect to cylinder 26 pin 64 rides up in the vertical portion of slot 66, and as the outer cylinder is finally turned, as explained above, to bring discharge ports 38 and 40 into registry, pin 64 will move into the horizontal portion of the camway 66. In this locking position further longitudinal movement between the parts is prevented.

Bottle 10 is filled from the dispensing pump in the usual manner while the parts are in the position just described, the oil passing from the tank or container through discharge pipe 56, tube 54 and to the bottle through discharge ports 40 and 38. Having filled the bottle, and in order to remove it from the pump, it is turned back through the 90 degree angle to disengage the locking means, and the bottle is then withdrawn from engagement with the key-like portion of tube 54. When the key is withdrawn the inner cylinder 32 is again forced upwardly with respect to outer cylinder 26 by the action of a spring 68, which is confined within a longitudinal opening or bore in the wall of inner cylinder 32, and which is compressed, as the inner cylinder is moved downwardly, by a spring plunger 70, which operates in the same opening, and whose lower end rests on bottom 28 of outer cylinder 26.

In order that the air normally contained in the bottle 10 may be released as the bottle is filled, an air vent is provided and in this instance takes the form of a hollow tube 72 which is open at its upper end and is secured by welding or the like to outer cylinder 26.

An apparatus of preferred form and construction has been illustrated and described for the purpose of showing a way in which this invention may be practiced, but the inventive thought upon which this application is based is broader than this illustrative embodiment hereof. It is therefore understood that the scope of the invention is not to be limited by the present disclosure, reference being had to the appended claims for that purpose.

What I claim is:

1. The combination with a bottle having a filling opening, a closure for said opening, and means for locking said closure in a non-filling position, of a key like member adapted to unlock and move the said closure into a filling position.

2. In combination with a container having a filling opening, means for preventing unauthorized filling thereof comprising a closure member for said filling opening, means for locking said closure member in a closed position, and means adapted to be secured to the discharge pipe of a dispensing apparatus and adapted for engagement with said closure member to unlock it and actuate it into a filling position.

3. The combination with a container having a filling opening, a closure member therefor, and means for locking said closure member in closed position to prevent unauthorized filling of the container, of a key-like member adapted to be secured to the discharge pipe of a dispensing apparatus and constituting a continuation thereof, said key-like member being adapted to cooperate with said closure member to unlock it and actuate the closure member into a filling position.

4. In combination with a container having a filling opening, means for preventing unauthorized filling thereof, comprising a closure member for said filling opening, means for locking said closure member in a non-filling position, means adapted to be secured to the discharge pipe of a dispensing apparatus and adapted for cooperative engagement with said closure member to unlock it and actuate it into filling position, and means for securing said closure member in operative position during the filling operation.

5. In combination with a bottle top having a filling opening, a tamper-proof closure for said opening comprising a valve housing secured in said opening, a valve in said housing adapted to control the filling of the bottle, means for normally locking the valve in a closed position, and means for unlocking the locking means and for opening said valve to a filling position.

6. In combination with a bottle top having a filling opening, a tamper-proof closure for said opening comprising a valve housing secured in said opening, a valve in said housing adapted to control the filling of the bottle, a tumbler mounted in the valve housing and adapted to engage the valve to normally maintain it in a closed position, and means for disengaging said tumbler from said valve and for moving the valve into a filling position.

7. In a device of the class described, an outer cylinder substantially closed at its lower end and formed with a port extending through the wall thereof, a second cylinder closed at its lower end and formed with a port in the wall thereof, rotatably mounted within the outer cylinder, and means for rotating and moving the inner cylinder longitudinally to bring the port thereof into registration with the port in the outer cylinder to provide for the free passage of fluid through the inner cylinder to the container.

8. A closure for a container top having a filling opening therein comprising a cylindrical member disposed within said opening and extending into the container, said cylinder being substantially closed at its lower end and formed with a filling opening in the wall thereof, a second cylinder closed at its lower end and formed with a filling opening in the wall thereof, movably mounted within the first named cylinder, means for rotating and moving the inner cylinder longitudinally within the outer cylinder to bring the filling openings in the two cylinders into registration, and resilient means constantly tending to actuate the inner cylinder in the opposite direction for returning it to its closed position subsequent to the action of the first named means.

9. The combination with a bottle having a filling opening, a closure for said opening, a tumbler adapted to lock said closure in a non-filling position, of a key adapted to actuate said tumbler to release the closure and to move said closure into a filling position.

10. The combination with a bottle having a filling opening, a closure for said opening, a plurality of tumblers adapted to engage said closure and lock it in a non-filling position, of a key exteriorly formed to provide a plurality of projections adapted to disengage said tumblers from said closure and permit the closure to be moved to a filling position.

In witness whereof I have hereunto set my hand this 7 day of October, 1931.

THOMAS P. GARDNER.

DISCLAIMER 1,877,292.—*Thomas P. Gardner*, Port Arthur, Tex. COMBINATION INFLOW-CONTROLLING AND FLUID-DISCHARGE MEANS. Patent dated September 13, 1932. Disclaimer filed August 28, 1934, by the assignee, *The Texas Company*.

Hereby enters this disclaimer to claims 1, 2, 3, 4, 5, 6, 9 and 10 of said Letters Patent.

[*Official Gazette September 18, 1934.*]

end and formed with a filling opening in the wall thereof, movably mounted within the first named cylinder, means for rotating and moving the inner cylinder longitudinally within the outer cylinder to bring the filling openings in the two cylinders into registration, and resilient means constantly tending to actuate the inner cylinder in the opposite direction for returning it to its closed position subsequent to the action of the first named means.

9. The combination with a bottle having a filling opening, a closure for said opening, a tumbler adapted to lock said closure in a non-filling position, of a key adapted to actuate said tumbler to release the closure and to move said closure into a filling position.

10. The combination with a bottle having a filling opening, a closure for said opening, a plurality of tumblers adapted to engage said closure and lock it in a non-filling position, of a key exteriorly formed to provide a plurality of projections adapted to disengage said tumblers from said closure and permit the closure to be moved to a filling position.

In witness whereof I have hereunto set my hand this 7 day of October, 1931.

THOMAS P. GARDNER.

DISCLAIMER 1,877,292.—*Thomas P. Gardner*, Port Arthur, Tex. COMBINATION INFLOW-CONTROLLING AND FLUID-DISCHARGE MEANS. Patent dated September 13, 1932. Disclaimer filed August 28, 1934, by the assignee, *The Texas Company*.

Hereby enters this disclaimer to claims 1, 2, 3, 4, 5, 6, 9 and 10 of said Letters Patent.

[*Official Gazette September 18, 1934.*]

DISCLAIMER 1,877,292.—*Thomas P. Gardner*, Port Arthur, Tex. COMBINATION INFLOW-CONTROLLING AND FLUID-DISCHARGE MEANS. Patent dated September 13, 1932. Disclaimer filed August 28, 1934, by the assignee, *The Texas Company*.

Hereby enters this disclaimer to claims 1, 2, 3, 4, 5, 6, 9 and 10 of said Letters Patent.

[*Official Gazette September 18, 1934.*]